US010285223B2

(12) United States Patent
Hatton et al.

(10) Patent No.: US 10,285,223 B2
(45) Date of Patent: May 7, 2019

(54) HEATING METHOD

(71) Applicant: MAGMA GLOBAL LIMITED, Hampshire (GB)

(72) Inventors: Stephen Hatton, Surrey (GB); Richard Damon Goodman Roberts, Hampshire (GB); Charles Alexander Tavner, West Sussex (GB)

(73) Assignee: Magma Global Limited, Portsmouth (GB)

( * ) Notice: Subject to any disclaimer, the term of this patent is extended or adjusted under 35 U.S.C. 154(b) by 294 days.

(21) Appl. No.: 15/021,187

(22) PCT Filed: Sep. 10, 2014

(86) PCT No.: PCT/GB2014/052747
§ 371 (c)(1),
(2) Date: Mar. 10, 2016

(87) PCT Pub. No.: WO2015/036756
PCT Pub. Date: Mar. 19, 2015

(65) Prior Publication Data
US 2016/0227611 A1 Aug. 4, 2016

(30) Foreign Application Priority Data

Sep. 10, 2013 (GB) .................................. 1316088.2

(51) Int. Cl.
*H05B 6/10* (2006.01)
*E21B 36/04* (2006.01)
(Continued)

(52) U.S. Cl.
CPC ............. *H05B 6/108* (2013.01); *E21B 36/04* (2013.01); *F16L 53/34* (2018.01); *H05B 3/14* (2013.01);
(Continued)

(58) Field of Classification Search
CPC .......... H05B 6/02; H05B 6/101; H05B 6/104; H05B 6/105; H05B 6/108; H05B 6/36;
(Continued)

(56) References Cited

U.S. PATENT DOCUMENTS 5,128,504 A * 7/1992 McGaffigan ............ B29C 65/32
219/633
5,786,575 A * 7/1998 Bleske ................. B23K 13/025
219/633

(Continued)

FOREIGN PATENT DOCUMENTS

WO 86/03088 A1 5/1986
WO 2012/095631 A2 7/2012

OTHER PUBLICATIONS

PCT Search Report from copending PCT Application No. PCT/GB2014/052747, dated Nov. 27, 2014, 2 pages.

*Primary Examiner* — Hung D Nguyen
(74) *Attorney, Agent, or Firm* — Levy & Grandinetti

(57) ABSTRACT

A tubular comprises a composite material including a matrix and a plurality of reinforcing elements embedded within the matrix. A method for heating the composite material of the tubular comprises exposing the composite material to a time-varying magnetic field to directly induce a flow of electrical current in the composite material. The method may comprise configuring the composite material so as to control the flow of electrical current and/or heat in the composite material. The method may be used for heating a composite fluid conduit for use in a subsea environment for the removal of the build-up of wax and/or hydrates on an inner surface of the fluid conduit. Additionally or alternatively, the method may be used for deforming a composite fluid conduit, or for joining a composite fluid conduit to a further component such as a further composite fluid conduit.

11 Claims, 8 Drawing Sheets

(51) Int. Cl.
  *H05B 3/14*    (2006.01)
  *H05B 3/56*    (2006.01)
  *F16L 53/34*   (2018.01)

(52) U.S. Cl.
  CPC ............... *H05B 3/145* (2013.01); *H05B 3/56*
                     (2013.01); *H05B 2214/03* (2013.01)

(58) Field of Classification Search
  CPC . H05B 6/365; H05B 6/40; H05B 6/42; H05B
        6/44; H05B 6/14; H05B 3/14; H05B
        3/145; H05B 3/56; H05B 2214/03; E21B
        36/04; F16L 53/004
  USPC ................ 219/643, 645, 630, 633, 672, 634
  See application file for complete search history.

(56)         References Cited

U.S. PATENT DOCUMENTS

2013/0108250 A1    5/2013  Bigex et al.
  2014/0080961 A1*   3/2014  Konagai ................. C08J 5/042
                                                        524/495
  2014/0155540 A1*   6/2014  Imai ........................ C08J 5/04
                                                        524/540

* cited by examiner

HEATING METHOD

FIELD

The present invention relates to a method for heating a composite tubular and in particular, though not exclusively, for heating a composite fluid conduit for use in a subsea environment.

BACKGROUND

Tubular infrastructure including fluid conduits such as pipelines, risers and the like is commonly deployed subsea for the production of oil and gas from subterranean formations. Precipitation and build-up of unwanted deposits such as wax, hydrates and the like in such infrastructure is a common problem as a consequence of the relatively low temperatures in the subsea environment. Such build-up may reduce flow rates of hydrocarbon fluids through the infrastructure leading to a reduction in pressure and, in the worst case, total blockage of the infrastructure. As it becomes increasingly viable to produce oil and gas from hydrocarbon reservoirs located at greater sea depths, tubular infrastructure is increasingly being exposed to colder sea temperatures which exacerbate the problems of precipitation and build-up of unwanted deposits in the tubular infrastructure.

Depending on the particular geometry of the tubular infrastructure, different portions of the tubular infrastructure or different tubular components may be more susceptible to waxing than others. For example, bends in tubular infrastructure may be particularly susceptible to waxing because the change in direction of fluid flow at a bend may cause turbulence or recirculation of hydrocarbon fluids which results in the creation of a localised region of reduced fluid flow at the bend. Accordingly, it may be desirable to selectively control the amount of heat applied to different portions of tubular infrastructure or different tubular components used in the production of oil and gas particularly for tubular infrastructure or components for use in subsea environments.

Known methods for removing build-up from the interior of tubular infrastructure for oil and gas production include mechanical scraping or pigging methods, chemical methods, the use of pressure pulses, and heating of the hydrocarbon fluids and/or the subsea infrastructure. For example, US patent publication US 2010/0300486 relates to a known method for removal of solids that build-up in a system conduit containing or conveying fluid, especially to a method for removal of wax from pipelines and other equipment used for the transport of hydrocarbons. The method relies upon time-limited heating of the pipe to loosen wax deposits from an internal surface of the pipe and the transportation of the loosened wax as solid parts within a hydrocarbon fluid stream. The pipe may be heated electrically or using hot water. The method may be used with existing pipelines. The method may be used to clean wells. The method may be used to clean heat exchangers that are part of the top-side process equipment.

It is becoming more common to use composite tubulars for transporting hydrocarbons especially in subsea environments where such tubulars can provide a number of advantages over conventional steel tubulars. For example, US 2013/0108250 discloses a line for transporting a hydrocarbon. The line comprises a hollow tube having an electrically insulating outer surface, a heating layer with carbon fibres embedded in a polymer material, an electrical insulation layer arranged on the heating layer, a reinforcing layer with carbon fibres embedded in a polymer material arranged on the electrical insulation layer, and power supply means for feeding an electrical current to the heating layer for heating the tube. The power supply means may comprise a cable and a connection element which comes into contact with carbon fibres of the heating layer at a position adjacent to one end of the line, wherein the connection element is connected to the cable. In a different variant, the power supply means may comprise at least one receiving device connected to the heating layer and suitable for receiving a magnetic induction field and for generating electrical current.

Joining composite tubulars to one another or joining composite tubulars to other non-composite components such as other steel components is challenging. This is especially the case when joining composite tubulars in a subsea environment.

SUMMARY

It should be understood that one or more of the features of one aspect of the present invention may apply alone or in any combination in relation to any other aspect of the present invention.

According to an aspect of the present invention there is provided a method for heating a tubular.

The tubular may comprise a composite material including a matrix and a plurality of reinforcing elements embedded within the matrix.

The method may comprise establishing a flow of electrical current in the composite material so as to heat the composite material.

The method may comprise exposing the composite material to a time-varying magnetic field to directly induce a flow of electrical current in the composite material.

According to an aspect of the present invention there is provided a method for heating a tubular, wherein the tubular comprises a composite material including a matrix and a plurality of reinforcing elements embedded within the matrix, and the method comprises:

exposing the composite material to a time-varying magnetic field to directly induce a flow of electrical current in the composite material.

The induced flow of electrical current may result in heating of the composite material. It has surprisingly been found that for a tubular formed from a composite material which includes a matrix and a plurality of reinforcing elements embedded within the matrix, it is possible to use a time-varying magnetic field to directly induce a sufficient flow of electrical current in the composite material of the tubular to provide sufficient heat to melt wax and/or hydrates deposited on an inner surface of the tubular and, therefore, to at least partially assist in the removal of wax and/or hydrates deposited on the inner surface of the tubular. This may be particularly important before, during and/or after deployment of the tubular in a subsea environment. The composite material of the tubular may be specifically configured for this purpose. In contrast to conventional methods for heating a composite tubular which rely upon indirect induction of an electrical current in the composite material of the tubular, the methods for heating a composite tubular described herein rely upon direct induction of an electrical current in the composite material of the tubular. More specifically, unlike conventional methods, the methods described herein do not require the use of a separate dedicated receiving device which is provided or integrated with a composite tubular, which is connected to a heating layer of the composite tubular, and which is configured to receive a magnetic field for the induction of an electrical current in the receiving device for the generation of an electrical current in the heating layer of the composite tubular. Accordingly, the methods for heating a composite tubular described herein may allow heating of a composite tubular which has a simpler, more robust structure than that of a composite tubular configured for heating using conventional methods.

The tubular may be configured for use in a subsea environment.

The tubular may comprise a fluid conduit.

The tubular may be configured for the transport of hydrocarbon fluids.

The time-varying magnetic field may comprise an alternating magnetic field and the electrical current may comprise an alternating electrical current.

The time-varying magnetic field may extend radially inwardly towards an outer surface of the composite material of the tubular.

The time-varying magnetic field may extend radially outwardly towards an inner surface of the composite material of the tubular.

The method may comprise bringing a magnet and the composite material into proximity.

The magnet may comprise an electromagnet.

The method may comprise energising the electromagnet using a time-varying electrical current.

The method may comprise energising the electromagnet using a time-invariant electrical current.

The electromagnet may comprise a core and an elongate electrical conductor such as an electrical wire wound around the core.

The use of a core may serve to enhance a strength of the magnetic field and, therefore, the efficiency of inductive heating of the composite material of the tubular.

The core may be formed from a magnetic material.

The core may have a high permeability.

The core may be ferromagnetic.

The core may comprise a metal such as iron or steel.

The core may comprise a ferrite material.

The core may be split.

The core may define a gap.

The method may comprise inserting at least a portion of the composite material of the tubular into the gap.

The gap defined by the core may be greater or equal to an outer diameter of the tubular.

The method may comprise inserting the tubular into the gap defined by the core.

The magnet may comprise a permanent magnet.

The method may comprise mounting the magnet radially outwardly of the composite material of the tubular.

The method may comprise mounting the magnet radially inwardly of the composite material of the tubular.

The method may comprise moving the magnet and the composite material relative to one another.

The method may comprise rotating the magnet relative to the composite material of the tubular.

The method may comprise rotating the composite material of the tubular relative to the magnet.

The method may comprise matching an orientation of the time-varying magnetic field to an orientation of an electrically conductive loop formed by the reinforcing elements of the composite material. For example, the method may comprise aligning the time-varying magnetic field so as to be generally parallel to an axis defined by an electrically conductive loop formed by the reinforcing elements. This may enhance the coupling of the time-varying magnetic field to the composite material and enhance the efficiency of heating of the composite material.

The method may comprise matching a geometry of the time-varying magnetic field to a geometry of an electrically conductive loop formed by the reinforcing elements. This may further enhance the coupling of the time-varying magnetic field to the composite material and enhance the efficiency of heating of the composite material.

The method may comprise applying an electric field to the composite material so as to drive an electrical current through the composite material. Driving an electrical current through the composite material in this way may provide additional heating to that provided by the flow of electrical current induced by the time-varying magnetic field.

The electrical field may comprise a direct current (DC) electric field. This may result in the flow of DC through the composite material for resistive heating of the composite material.

The electrical field may comprise an alternating current (AC) electric field. This may result in the flow of AC through the composite material. If AC current is used, it is thought that not only does resistive heating occur between adjacent reinforcing elements, but that AC magnetic fields are also created which induce AC current flow in non-adjacent reinforcing elements. Consequently, AC may be used to heat a composite material more evenly than DC.

The method may comprise using a DC electric field for tubular lengths of greater than 100 m, greater than 1 km, or greater than 10 km.

The method may comprise using an AC electric field for tubular lengths of less than or equal to 100 m, less than or equal to 1 km, or less than or equal to 10 km. Depending on the configuration of reinforcing elements in the matrix material, the capacitance of the composite material may be so high as to effectively prohibit the use of AC electric fields for tubular lengths of greater than 100 m, greater than 1 km, or greater than 10 km.

The method may comprise using an AC electric field superimposed upon a DC electric field.

The method may comprise inserting electrical conductors into the composite material and using an electrical supply to apply the electrical field to the composite material via the electrical conductors.

The method may comprise:

locating the tubular subsea; and then heating the tubular.

The method may comprise establishing a flow of electrical current in the composite material in a region of a bend in the tubular.

The method may comprise establishing a sufficient flow of electrical current in the composite material of the tubular so as to soften the matrix material. The method may comprise configuring the composite material for this purpose.

The method may comprise forcing a component and the composite material of the tubular together so as to deform the composite material.

The component may comprise the same material as the matrix.

The component may comprise the same material as the composite material.

The component may comprise a metal.

The component may comprise steel.

The component may comprise a connector for use in connecting the tubular to a further tubular.

The component may comprise a further tubular.

Softening the composite material of the tubular may permit deformation of the composite material of the tubular when the component and the composite material of the tubular are forced together so that a surface of the composite material of the tubular complies with the shape of the component. This may provide an enhanced geometric match between the composite material of the tubular and the component. This may distribute or enhance the uniformity of load transfer between the composite material of the tubular and the component. For example, the composite material of the tubular may define a generally conical wedge on an outer surface of the tubular which is configured to engage a generally conical recess defined within a collar. Deforming the composite material of the tubular may improve the uniformity of load transfer between the generally conical composite wedge of the tubular and the generally conical recess of the collar. This may be particularly important where the collar is formed from a metal such as steel.

The method may comprise establishing a sufficient flow of electrical current in the composite material so as to melt the matrix material. The method may comprise configuring the composite material for this purpose.

The method may comprise bringing the composite material of the tubular and a component into engagement.

The method may comprise bringing the composite material of the tubular and the component into engagement, before, during and/or after melting of the matrix material.

Melting the matrix of the composite material of the tubular and bringing the composite material of the tubular and a component into engagement may permit the matrix of the composite material to fuse or bond to the component thereby joining the tubular and the component.

The method may comprise allowing the melted matrix material to flow so as to define features of the composite material of the tubular which interlock with complementary features of the component on solidification of the matrix material.

Additional matrix material may be provided, electrically heated and melted to define features of the composite material of the tubular which interlock with complementary features of the component if required.

According to an aspect of the present invention there is provided a method for manufacturing a tubular, the tubular comprising a composite material including a matrix and a plurality of reinforcing elements embedded within the matrix, and the method comprising:

configuring the reinforcing elements and/or the matrix so as to control the direct induction of a flow of electrical current in the composite material on exposure of the composite material to a time-varying magnetic field. The method may comprise configuring the composite material so as to control the flow of electrical current and/or heat in the composite material.

The method may comprise controlling the electrical conductivity of the reinforcing elements and/or the electrical resistivity of the matrix so as to control the flow of electrical current in the composite material.

The method may comprise controlling the thermal conductivity of the reinforcing elements and/or of the matrix so as to control the flow of heat through the composite material.

The method may comprise selecting reinforcing elements which are generally electrically conductive.

The method may comprise selecting reinforcing elements which are generally thermally conductive.

The method may comprise selecting reinforcing elements including fibres, particles and/or nanotubes.

The method may comprise selecting reinforcing elements which comprise carbon.

The method may comprise selecting carbon fibre reinforcing elements.

The method may comprise selecting a matrix material which is generally electrically insulating.

The method may comprise selecting a matrix material which is generally thermally insulating.

The method may comprise selecting a thermosetting or a thermoplastic polymer matrix material.

The method may comprise selecting a matrix material including at least one of polyether ether ketone (PEEK) material, a polyether ketone (PEK) material or a PVC material.

The method may comprise configuring the reinforcing elements within the matrix so as to control the flow of electrical current and/or heat in the composite material.

The method may comprise controlling a concentration and/or distribution of the reinforcing elements within the matrix so as to control the flow of electrical current and/or heat in the composite material.

The method may comprise selecting a volume fraction of the reinforcing elements within the matrix of greater than 30%, of greater than 50%, or of greater than 55%. It has been surprisingly been found that for a composite material comprising carbon fibre reinforcing elements in a PEEK matrix, for a carbon fibre volume fraction of greater than approximately 55%, the PEEK between the carbon fibres is sufficiently thin to allow a significant flow of electrical current between adjacent carbon fibre reinforcing elements. The use of such volume fractions may facilitate resistive heating when the induced electrical current flows between adjacent carbon fibre reinforcing elements.

The method may comprise using a higher concentration of reinforcing elements within the matrix in a region of a bend in the tubular. This may result in greater heating in the region of a bend in the tubular. This may help to melt and at least partially assist in the removal of thicker wax and/or hydrate deposits that may occur on the inner surface of the tubular in the region of the bend.

The method may comprise controlling a separation of adjacent reinforcing elements within the matrix so as to control the flow of electrical current in the composite material.

The method may comprise controlling the distribution of the reinforcing elements within the matrix so as to control the flow of electrical current in the composite material.

The method may comprise controlling the orientation of the reinforcing elements within the matrix so as to control the flow of electrical current in the composite material.

The method may comprise:

providing the tubular with a first composite layer having a plurality of first reinforcing elements; and providing the tubular with a second composite layer adjacent to the first layer, the second composite layer having a plurality of second reinforcing elements.

The method may comprise forming the second layer on the first layer.

The method may comprise controlling a separation between a first reinforcing element in the first composite layer and a second reinforcing element in the second composite layer so as to control a flow of electrical current between the first and second reinforcing elements.

The method may comprise controlling an electrical resistivity of the matrix material so as to control a flow of electrical current between the first and second reinforcing elements.

The method may comprise arranging the first and second composite layers so that the first and second reinforcing elements engage one another.

The method may comprise controlling the relative alignment of the first and second reinforcing elements.

The method may comprise:

aligning the first reinforcing elements along a first direction; and aligning the second reinforcing elements along a second direction.

The method may comprise selecting the first and second directions to be different. This may result in the formation of one or more crossings between a first reinforcing element in a first composite layer and a second reinforcing element in an adjacent second composite layer, wherein at each crossing, a first reinforcing element is in close proximity to, or engages, a second reinforcing element. The presence of such crossings may serve to enhance the macroscopic electrical conductivity of the composite material and thereby enhance the resistive heating of the composite material resulting from the induced flow of electrical current.

Different first and second directions may also result in the formation of generally rhombus- or diamond-shaped reinforcing element loops within the composite material, each loop comprising two first reinforcing elements within a first composite layer and two second reinforcing elements within a second composite layer. The presence of such reinforcing element loops may enhance the coupling between the time-varying magnetic field and the reinforcing element loops which may, in turn, enhance the electrical current induced in the reinforcing element loops and the efficiency of heating of the composite material of the tubular in the vicinity of the first and second composite layers.

The method may comprise selecting the first and second directions so that the first and second directions define equal and opposite angles relative to the longitudinal axis of the tubular.

The method may comprise selecting the first and second directions so that the first and second directions define equal and opposite angles relative to the longitudinal axis of the tubular, each angle having a magnitude of between 10° and 90°, of between 30° and 60°, of between 40° and 50°, or of approximately 45°.

The method may comprise selecting the first and second directions to be the same. This may avoid the formation of crossings between a first reinforcing element in a first composite layer and a second reinforcing element in an adjacent second composite layer. This may also serve to reduce the macroscopic electrical conductivity of the composite material and thereby reduce the resistive heating of the composite material. This may avoid the formation of reinforcing element loops and at least partially suppress the coupling between the time-varying magnetic field and the reinforcing elements. This may, in turn, at least partially suppress the heating of the composite material of the tubular in the vicinity of the first and second composite layers.

The method may comprise controlling a pitch between adjacent first reinforcing elements within the first composite layer. For example, the method may comprise controlling an average pitch between adjacent first reinforcing elements within the first composite layer. Controlling the pitch between adjacent first reinforcing elements within the first composite layer may permit control of the resistivity between the adjacent first reinforcing elements.

The method may comprise controlling a pitch between adjacent second reinforcing elements within the second composite layer. For example, the method may comprise controlling an average pitch between adjacent second reinforcing elements within the second composite layer. Controlling the pitch between adjacent second reinforcing elements within the second composite layer may permit control of the resistivity between the adjacent second reinforcing elements.

Controlling the pitch between adjacent first reinforcing elements within the first composite layer and controlling the pitch between adjacent second reinforcing elements within the second composite layer second may define reinforcing element loops of a predetermined geometry, for example a predetermined average geometry.

The method may comprise providing the tubular with a plurality of first composite layers alternating with a plurality of second composite layers, wherein each first composite layer has a plurality of first reinforcing elements aligned along a first direction and each second composite layer has a plurality of second reinforcing elements aligned along a second direction.

The method may comprise controlling the relative orientation of reinforcing elements within first and second adjacent composite layers. Such a method may be used to control the degree of electrical heating in the vicinity of the first and second composite layers.

The method may comprise electrically insulating different composite layers of the composite material from one another. For example, the method may comprise electrically insulating the first and second composite layers from one another.

The method may comprise providing an electrically insulating layer between different composite layers of the composite material.

The method may comprise providing a layer of glass material between different composite layers of the composite material.

The method may comprise electrically insulating an outer surface of the composite material from an environment surrounding the composite material.

The method may comprise providing an electrically insulating material on an outer surface of the composite material.

The method may comprise providing a glass material on an outer surface of the composite material.

The method may comprise providing an electrically insulating material formed of the matrix material on an outer surface of the composite material.

The method may comprise electrically insulating an inner surface of the composite material from a fluid flow path defined by the inner surface.

The method may comprise providing an electrically insulating material on an inner surface of the composite material.

The method may comprise providing a glass material on an inner surface of the composite material.

The method may comprise forming the composite material on an electrically insulating inner sleeve.

The method may comprise providing an electrically insulating material formed of the matrix material on an inner surface of the composite material.

According to an aspect of the present invention there is provided a method for removing wax or hydrates from a subsea composite fluid conduit formed from a matrix and a plurality of reinforcing elements embedded within the matrix, the method comprising:

exposing the composite material to a time-varying magnetic field to directly induce a flow of electrical current in the composite material.

According to an aspect of the present invention there is provided a method for matching a shape of a composite component for engagement with a further component, the composite component comprising a matrix and a plurality of reinforcing elements embedded within the matrix, and the method comprising:

establishing a sufficient flow of electrical current in the composite component so as to soften the matrix material; and forcing the composite component and the component together.

The method may comprise exposing the composite component to a time-varying magnetic field of sufficient strength so as to directly induce the sufficient flow of electrical current in the composite component.

The method may comprise configuring the material of the composite component for this purpose.

The further component may comprise the same material as the matrix.

The further component may comprise the same material as the composite component.

The further component may comprise a metal.

The further component may comprise steel.

The further component may comprise a connector for use in connecting the composite component to a further composite component.

The further component may comprise a further composite component.

Softening the composite component may permit deformation of the composite component when the composite component and the further component are forced together so that a surface of the composite component complies with the shape of the further component. This may provide an enhanced geometric match between the composite component and the further component. This may distribute or enhance the uniformity of load transfer between the composite component and the further component.

According to an aspect of the present invention there is provided a method for joining a composite component and a further component, the composite component comprising a matrix and a plurality of reinforcing elements embedded within the matrix, and the method comprising:

establishing a sufficient flow of electrical current in the composite material so as to melt the matrix material; and bringing the composite component and the further component into engagement.

The method may comprise exposing the composite component to a time-varying magnetic field of sufficient strength so as to directly induce the sufficient flow of electrical current in the composite component.

The method may comprise configuring the material of the composite component for this purpose.

The method may comprise bringing the composite component and the further component into engagement, before, during and/or after melting of the matrix material.

Melting the matrix of the composite component and bringing the composite component and the further component into engagement may permit the matrix of the composite component to fuse or bond to the further component thereby joining the composite component and the further component.

The method may comprise:

allowing the melted matrix material to flow so as to define features of the composite component which interlock with complementary features of the further component on solidification of the matrix material.

Additional matrix material may be provided, electrically heated and melted to define features of the composite component which interlock with complementary features of the further component if required.

According to an aspect of the present invention there is provided a tubular comprising a composite material including a matrix and a plurality of reinforcing elements embedded within the matrix, wherein the composite material is configured so as to control the direct induction of a flow of electrical current in the composite material on exposure of the composite material to a time-varying magnetic field.

The composite material may be configured so as to control the electrical and/or magnetic properties of the composite material.

The composite material may be configured so as to control the thermal properties of the composite material.

The tubular may be configured for use in a subsea environment.

The tubular may comprise a fluid conduit.

The tubular may be configured for the transport of hydrocarbon fluids.

The reinforcing elements of the composite material may be arranged so as to provide an electrically conductive loop.

The electrically conductive loop may have a predetermined geometry and/or orientation. The geometry and/or orientation of the electrically conductive loop may be selected to enhance coupling with a time-varying magnetic field.

The reinforcing elements may have a predetermined electrical conductivity.

The matrix may have a predetermined electrical resistivity.

The reinforcing elements may be generally electrically conductive.

The reinforcing elements may be generally thermally conductive.

The reinforcing elements may include fibres, particles and/or nanotubes.

The reinforcing elements may comprise carbon.

The reinforcing elements may comprise carbon fibre reinforcing elements.

The matrix material may be generally electrically insulating.

The matrix material may be generally thermally insulating.

The matrix material may comprise a thermosetting or a thermoplastic polymer matrix.

The matrix material may comprise a polyether ether ketone (PEEK) material, a polyether ketone (PEK) material or a PVC material.

The reinforcing elements may be configured within the matrix so as to control the flow of electrical current and/or heat in the composite material.

The reinforcing elements may have a concentration and/or distribution within the matrix so as to control the flow of electrical current and/or heat in the composite material.

A volume fraction of the reinforcing elements within the matrix may be greater than 30%, greater than 50%, or greater than 55%.

A concentration of reinforcing elements within the matrix may be higher in a region of a bend in the tubular.

Adjacent reinforcing elements within the matrix may have a separation selected so as to control the flow of electrical current in the composite material.

A distribution of the reinforcing elements within the matrix may be selected so as to control the flow of electrical current in the composite material.

An orientation of the reinforcing elements within the matrix may be selected so as to control the flow of electrical current in the composite material.

The tubular may comprise:
a first composite layer having a plurality of first reinforcing elements; and
a second composite layer adjacent to the first layer, the second composite layer having a plurality of second reinforcing elements.

The second layer may be formed on the first layer.

A separation between a first reinforcing element in the first composite layer and
a second reinforcing element in the second composite layer may be controlled so as to control a flow of electrical current between the first and second reinforcing elements.

An electrical resistivity of the matrix material may be controlled so as to control a flow of electrical current between the first and second reinforcing elements.

The first and second composite layers may be arranged so that the first and second reinforcing elements engage one another.

The relative alignment of the first and second reinforcing elements may be controlled.

The first reinforcing elements may be aligned along a first direction.

The second reinforcing elements may be aligned along a second direction.

The first and second directions may be different.

The first and second directions may define equal and opposite angles relative to the longitudinal axis of the tubular.

The first and second directions may define equal and opposite angles relative to the longitudinal axis of the tubular, each angle having a magnitude of between 10° and 90°, of between 30° and 60°, of between 40° and 50°, or of approximately 45°.

The first and second directions may be the same.

Adjacent first reinforcing elements within the first composite layer may have a predetermined pitch.

Adjacent second reinforcing elements within the second composite layer may have a predetermined pitch.

Controlling the pitch between adjacent second reinforcing elements within the second composite layer may permit control of the resistivity between the adjacent second reinforcing elements.

Controlling the pitch between adjacent first reinforcing elements within the first composite layer and controlling the pitch between adjacent second reinforcing elements within the second composite layer second may define reinforcing element loops of a predetermined geometry, for example a predetermined average geometry.

The tubular may have a plurality of first composite layers alternating with a plurality of second composite layers, wherein each first composite layer has a plurality of first reinforcing elements aligned along a first direction and each second composite layer has a plurality of second reinforcing elements aligned along a second direction.

The relative orientation of reinforcing elements within first and second adjacent composite layers may be controlled.

Different composite layers of the composite material may be electrically insulated from one another. The first and second composite layers may be electrically insulated from one another.

The tubular may comprise an electrically insulating layer between different composite layers of the composite material.

The tubular may comprise a layer of glass material between different composite layers of the composite material.

The composite material may comprise an electrically insulating outer surface.

The tubular may comprise an electrically insulating material on an outer surface of the composite material.

The tubular may comprise a glass material on an outer surface of the composite material.

The tubular may comprise an electrically insulating material formed of the matrix material on an outer surface of the composite material.

The composite material may comprise an electrically insulating inner surface. The tubular may comprise an electrically insulating material on an inner surface of the composite material.

The tubular may comprise a glass material on an inner surface of the composite material.

The tubular may comprise an electrically insulating inner sleeve.

The tubular may comprise an electrically insulating material formed of the matrix material on an inner surface of the composite material.

According to an aspect of the present invention there is provided a tubular comprising a first layer of composite material including a matrix and a first plurality of reinforcing elements embedded within the matrix and a second layer of composite material including the matrix and a second plurality of reinforcing elements embedded within the matrix, wherein the first and second plurality of reinforcing elements are electrically isolated from one another.

The structural and electrical properties of such a tubular may be selected independently of one another according to the configuration of the first and second layers of composite material.

One of the first and second layers of composite material may be configured to provide the tubular with a predetermined structural property.

The plurality of reinforcing elements of at least the other of the first and second layers of composite material may be electrically conductive.

The plurality of reinforcing elements of the other of the first and second layers of composite material may be aligned in a single direction.

The plurality of reinforcing elements of the other of the first and second layers of composite material may be aligned along a longitudinal direction of the tubular.

According to an aspect of the present invention there is provided a method for heating a tubular, wherein the tubular comprises a composite material including a matrix and a plurality of reinforcing elements embedded within the matrix, and the method comprises:
establishing a flow of electrical current in the composite material so as to heat the composite material.

According to an aspect of the present invention there is provided a heated system, comprising:
a tubular which includes a composite material having a matrix and a plurality of reinforcing elements embedded within the matrix; and
an apparatus for generating a time-varying magnetic field, wherein the tubular and the apparatus are configured for coupling of the magnetic field therebetween to directly induce a flow of electrical current in the composite material.

The apparatus may comprise a magnet.

The magnet may comprise an electromagnet.

The electromagnet may comprise a core and an elongate electrical conductor such as an electrical wire wound around the core.

The use of a core may serve to enhance a strength of the magnetic field and, therefore, the efficiency of inductive heating of the composite material of the tubular.

The core may be formed from a magnetic material.

The core may have a high permeability.

The core may be ferromagnetic.

The core may comprise a metal such as iron or steel.

The core may comprise a ferrite material.

The core may be split.

The core may define a gap.

The gap defined by the core may be greater or equal to an outer diameter of the tubular.

The magnet may comprise a permanent magnet.

The magnet may be configured for movement relative to the composite material.

The apparatus may comprise an electrically insulating pad.

The magnet may be provided with, incorporated with, or at least partially housed or embedded within, the electrically insulating pad.

According to an aspect of the present invention there is provided a method for generating an electrical current within a tubular, wherein the tubular comprises a composite material including a matrix and a plurality of reinforcing elements embedded within the matrix, and the method comprises:

exposing the composite material to a time-varying magnetic field to directly induce a flow of electrical current in the composite material.

The method may comprise using the induced flow of electrical current to heat the composite material.

The method may comprise providing the induced flow of electrical current to an electrical component provided with the tubular.

The electrical component provided with the tubular may be at least partially embedded within a wall of the tubular.

BRIEF DESCRIPTION OF THE DRAWINGS

The present invention will now be described by way of non-limiting example only with reference to the following figures of which:

FIG. 2(*b*) is a section taken through the composite tubular of FIG. 2(*a*) in a plane perpendicular to some of the reinforcing elements of the composite tubular;

FIG. 3(*b*) is a section taken through the composite tubular of FIG. 3(*a*) in a plane perpendicular to some of the reinforcing elements of the composite tubular;

FIG. 4(*b*) illustrates a method of inductively heating the composite tubular of FIG. 4(*a*);

FIG. 4(*c*) is a cross-section on AA of FIG. 4(*b*);

FIG. 6(*b*) is a longitudinal cross-section through two composite tubulars during alignment end-to-end prior to heating and joining of the composite tubulars;

DETAILED DESCRIPTION OF THE DRAWINGS

Figure 1:
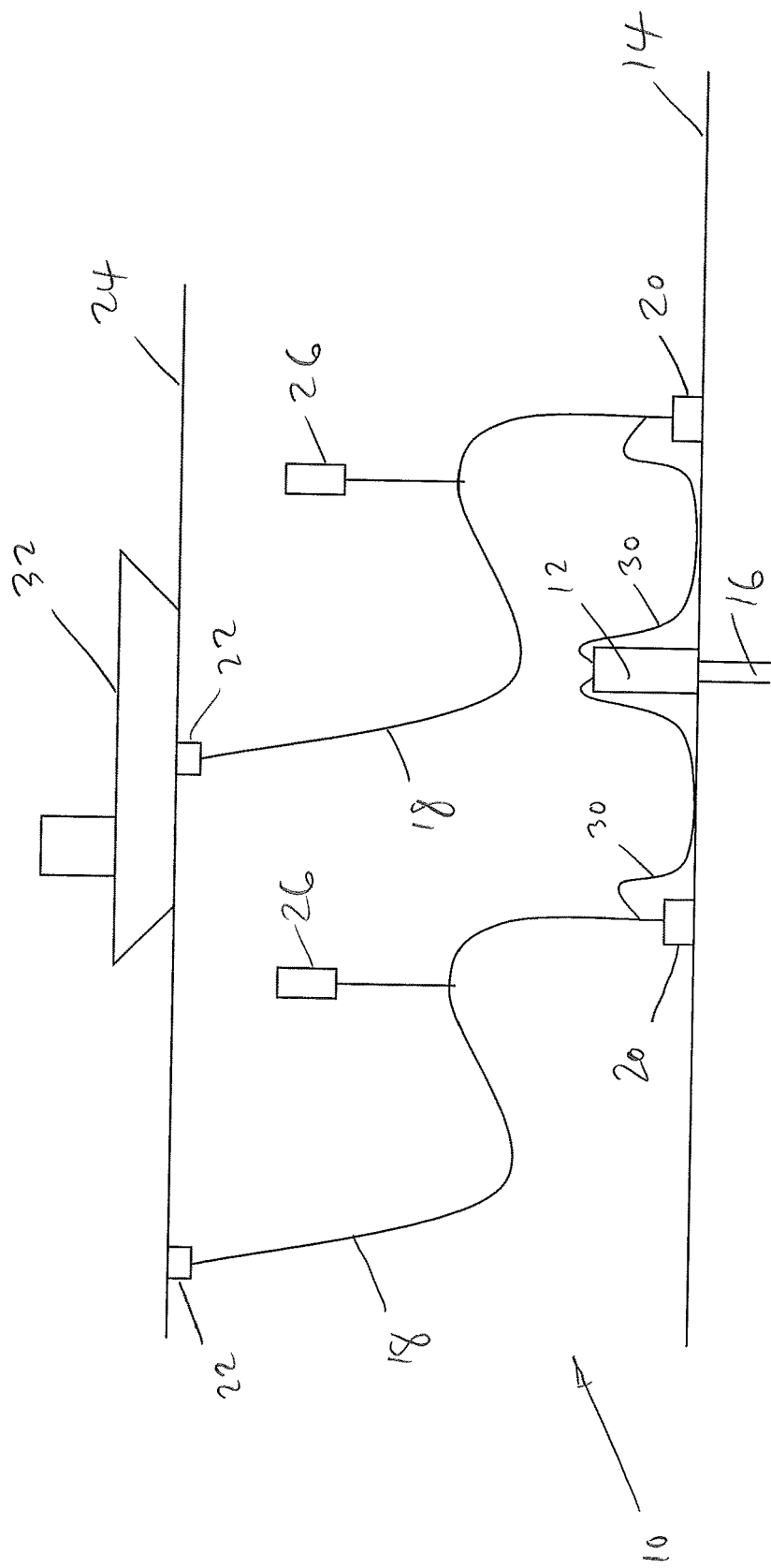
FIG. 1 illustrates subsea infrastructure for oil and gas production.

FIG. 1 illustrates subsea infrastructure for oil and gas production generally designated 10. The subsea infrastructure 10 includes a Christmas tree 12 located on the seabed 14 at the head of an oil or gas well 16 and two tubulars in the form of two marine risers 18. Each riser 18 extends from a position adjacent an anchor device 20 located on the seabed 14 to a surface buoyancy device 22 at the sea surface 24. Subsea buoyancy devices 26 may also be used to determine the path followed by each riser 18 between the seabed 14 and the sea surface 24. Tubular jumpers 30 connect the Christmas tree 12 and each of the risers 18. A surface vessel 32 is shown connected to one of the surface buoyancy devices 22 to receive hydrocarbon fluids from the oil or gas well 16 via the Christmas tree 12, a jumper 30 and the corresponding riser 18 for transportation to shore. One skilled in the art will understand that the subsea infrastructure 10 may also include many components additional to those shown in FIG. 1. For example, the subsea infrastructure 10 may include one or more additional Christmas trees, one or more additional risers and anchor devices, one or more manifolds, fluid processing equipment and the like. The portions of the risers 18 closest to the seabed 14 and the jumpers 30 are particularly susceptible to the build-up of wax, hydrates and the like as a consequence of the lower sea temperatures at greater depths. This is particularly true in the regions of bends in the risers 18 closest to the seabed 14 and the jumpers 30 where the change in direction of fluid flow may cause greater build-up of wax, hydrates and the like.

Figure 2:
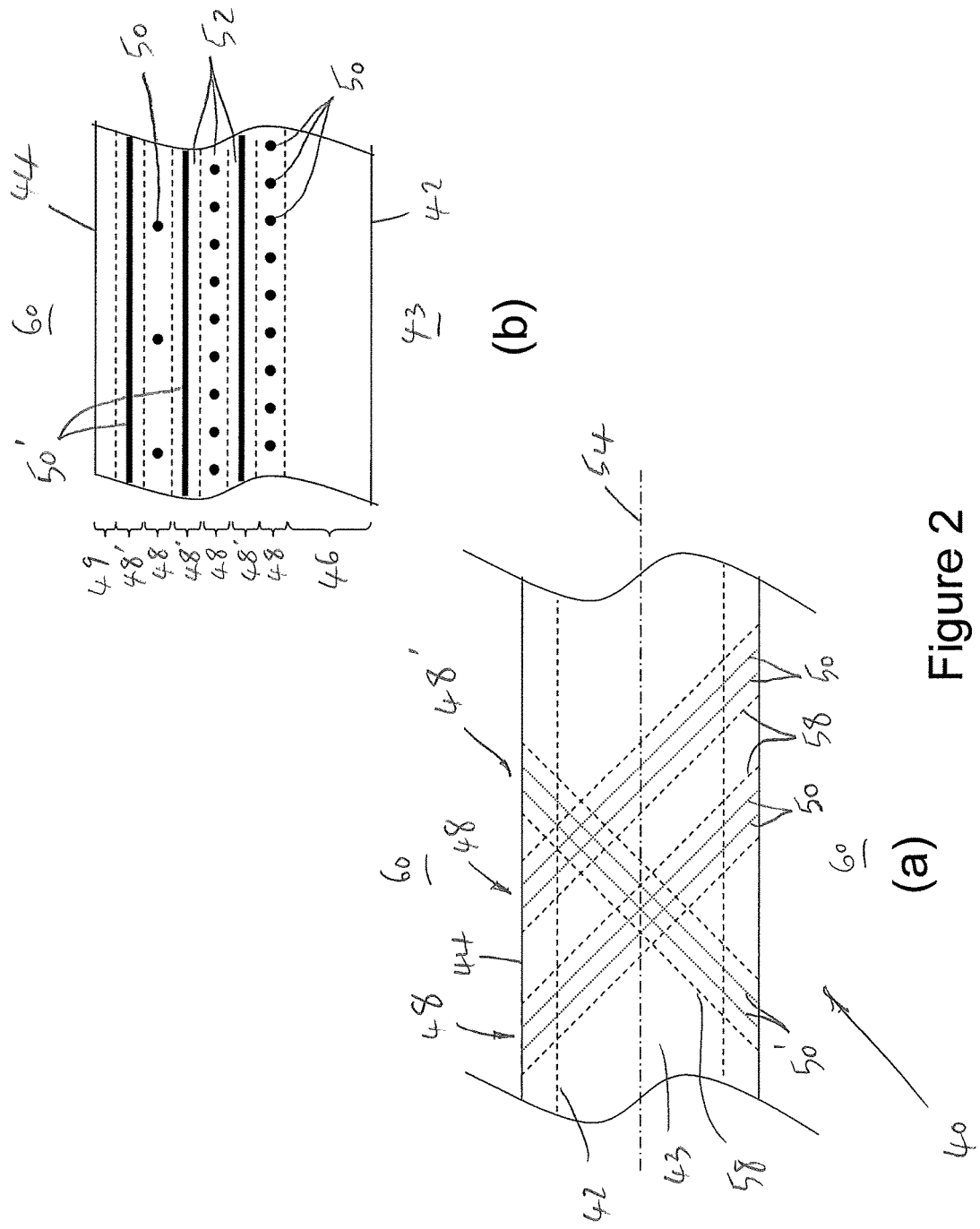
FIG. 2(*a*) is a side elevation of a composite tubular for use in the subsea infrastructure of FIG. 1.

FIGS. 2(*a*) and 2(*b*) illustrate a fluid conduit 40 for use in one of the risers 18 or one of the jumpers 30 of the subsea infrastructure 10 of FIG. 1. The fluid conduit 40 has an inner surface 42 defining a fluid flow path 43 and an outer surface 44. The fluid conduit 40 comprises a plurality of first composite layers 48 alternating with a plurality of second composite layers 48'. Each first composite layer 48 has one or more reinforcing elements in the form of one or more carbon fibres 50 embedded within a PEEK matrix material 52 and aligned at +45° with respect to a longitudinal axis 54 of the fluid conduit 40. Each second composite layer 48' has one or more reinforcing elements in the form of one or more carbon fibres 50' embedded within a PEEK matrix material 52 and aligned at −45° with respect to the longitudinal axis 54.

FIG. 2(*b*) shows a section through a wall of the fluid conduit 40 of FIG. 2(*a*) taken along a plane which is perpendicular to the carbon fibres 50 within the first composite layers 48 and parallel to the carbon fibres 50' within the second composite layers 48'. The fluid conduit 40 comprises a polyether ether ketone (PEEK) inner sleeve 46. The inner sleeve 46 defines the inner surface 42 of the fluid conduit 40. The composite layers 48, 48' are formed around the inner sleeve 46. A PEEK outer layer 49 is formed around the composite layers 48, 48'. Each composite layer 48, 48' is formed by helically wrapping composite tape 58 around the PEEK inner sleeve 46 and any inner composite layers 48, 48' at the appropriate angle with respect to the longitudinal axis 54.

It should be understood that, although the carbon fibres 50, 50' are electrically and thermally conductive, PEEK is generally electrically and thermally resistive. Accordingly, the concentration and the distribution of the carbon fibres 50, 50' within the PEEK matrix material 52 are carefully controlled to provide the plurality of composite layers 48, 48' with a predetermined electrical and/or thermal conductivity. It has surprisingly been found that, despite the presence of the generally insulating PEEK matrix 52 between the carbon fibres 50, 52', for carbon fibre volume fractions greater than 55% in each of the composite layers 48, 48', the composite layers 48, 48' become sufficiently electrically conductive to permit a flow of electrical current to be established within and between the composite layers 48, 48' as described in more detail below.

It should also be understood that, although only one layer of carbon fibres 50, 50' is shown embedded within each composite layer 48, 48', there may be more than one layer of carbon fibres 50, 50' embedded within each composite layer 48, 48'. In addition, although the carbon fibres 50, 50' of adjacent composite layers 48, 48' are shown as being separated by PEEK matrix material 52 in FIGS. 2(*a*) and 2(*b*), depending on the concentration and the distribution of the carbon fibres 50, 50' within the PEEK matrix material 52, the carbon fibres 50, 50' of adjacent composite layers 48, 48' may engage one another so as to define an electrically and thermally conductive path. Moreover, although FIG. 2(*b*) shows three pairs of composite layers 48, 48', there may be fewer or more pairs of composite layers than three. Also, although FIG. 2(*a*) shows only two carbon fibres 50, 50' embedded across a width of the composite tape 58, there may be more or fewer than two carbon fibres 50, 50' embedded across a width of the composite tape 58.

The PEEK inner sleeve 46 is sufficiently thick so as to electrically insulate the composite layers 48, 48' from any fluid present in the fluid flow path 43. The total thickness of the plurality of composite layers 48, 48' may be substantially greater than the thickness of the PEEK inner sleeve 46 shown in FIG. 2(*b*). The outer PEEK layer 49 is sufficiently thick so as to electrically insulate the composite layers 48, 48' from an external environment such as seawater 60 which may, in use, surround the fluid conduit 40.

The different alignment of the carbon fibres 50, 50' within the first and second composite layers 48, 48' provides a plurality of carbon fibre crossings (see FIG. 2(*a*)), wherein at each carbon fibre crossing a carbon fibre 50 of the first composite layer is in close proximity to, or engages, a carbon fibre 50' of the second composite layer. The presence of such carbon fibre crossings may serve to enhance the flow of electrical current in the composite layers 48, 48' as will be described in more detail below. As shown in FIG. 2(*b*), the concentration of carbon fibres 50, 50' in the inner composite layers 48, 48' is greater than the concentration of carbon fibres 50, 50' in the outer composite layers 48, 48'. This may increase the electrical conductivity of the inner composite layers 48, 48' relative to the outer composite layers 48, 48' leading to higher current densities in the inner composite layers 48, 48' than in the outer composite layers 48, 48'. This may, in turn, result in preferential heating of the inner composite layers 48, 48', thereby raising the temperature of the fluid flow path 43 sufficiently to melt any wax or hydrate build-up deposited on the inner surface 42 of the fluid conduit 40.

Figure 3:
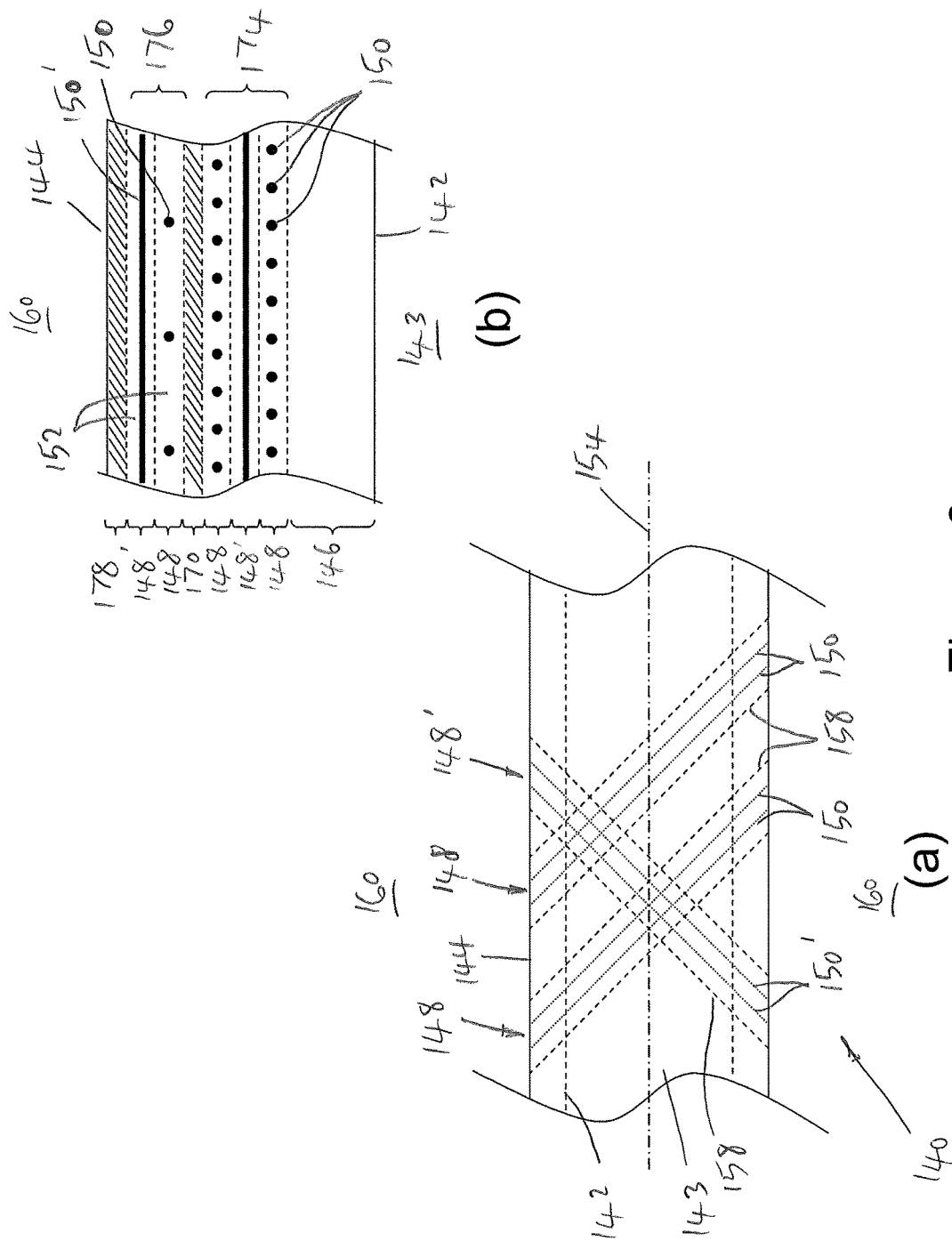
FIG. 3(*a*) is a side elevation of an alternative composite tubular for use in the subsea infrastructure of FIG. 1.

FIGS. 3(*a*) and 3(*b*) illustrate an alternative fluid conduit 140 for use in one of the risers 18 or one of the jumpers 30 of the subsea infrastructure 10 of FIG. 1. The fluid conduit 140 shares many features with the fluid conduit 40 of FIGS. 2(*a*) and 2(*b*) and, as such, like features in FIGS. 3(*a*) and 3(*b*) share like reference numerals with the corresponding features in FIGS. 2(*a*) and 2(*b*) incremented by "100". The fluid conduit 140 of FIGS. 3(*a*) and 3(*b*) differs from the fluid conduit 40 of FIGS. 2(*a*) and 2(*b*) in that the fluid conduit 140 includes an electrically insulating glass isolation layer 170 located between an inner plurality 174 of composite layers 148, 148' and an outer plurality 176 of composite layers 148, 148'. In addition, the fluid conduit 140 comprises an electrically insulating outer glass layer 178. The glass isolation layer 170 may serve to electrically isolate the inner plurality 174 of composite layers 148, 148' from the outer plurality 176 of composite layers 148, 148'. This may allow a degree of decoupling of the electrical and structural properties of the fluid conduit 140. For example, this may allow the inner plurality 174 of composite layers 148, 148' to be configured to provide the fluid conduit 140 with a predetermined electrical conductivity, whilst also allowing the outer plurality 176 of composite layers 148, 148' to be independently configured to provide the fluid conduit 140 with predetermined structural properties.

Figure 4:
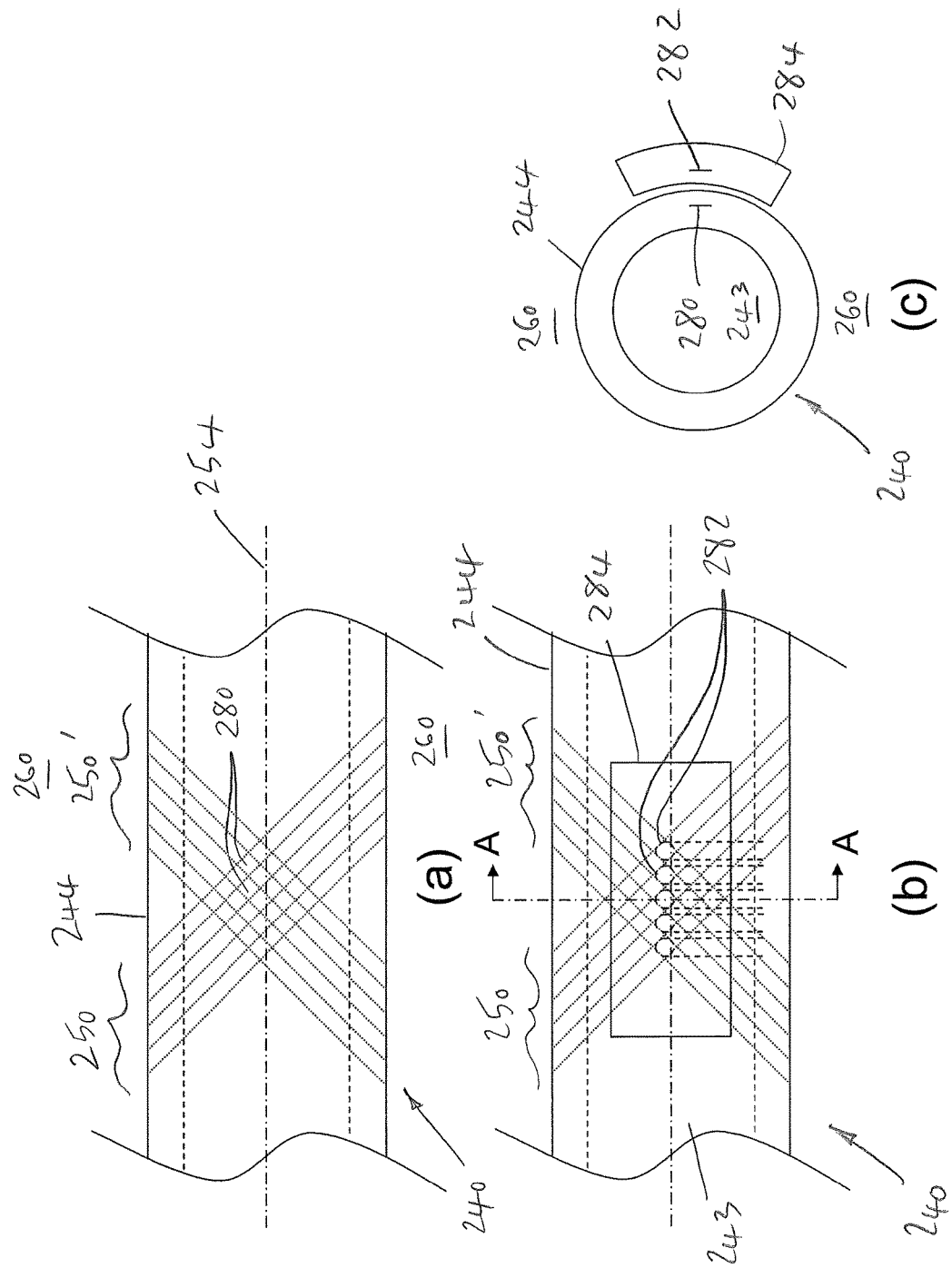
FIG. 4(*a*) is a side elevation of a composite tubular for use in the subsea infrastructure of FIG. 1.

Referring now to FIGS. 4(*a*)-4(*c*), there is illustrated a method for heating a fluid conduit 240 which may represent the fluid conduit 40 of FIGS. 2(*a*) and 2(*b*) or the fluid conduit 140 of FIGS. 3(*a*) and 3(*b*). As shown in FIG. 4(*a*), the fluid conduit 240 comprises a plurality of first composite layers alternating with a plurality of second composite layers. Each first composite layer has one or more reinforcing elements in the form of one or more carbon fibres 250 embedded within a PEEK matrix material 252. Each second composite layer has one or more reinforcing elements in the form of one or more carbon fibres 250' embedded within a PEEK matrix material 252. The carbon fibres 250 of the first composite layers are aligned at an angle of +45° with respect to a longitudinal axis 254 of the fluid conduit 240 and the carbon fibres 250' of the second composite layers are aligned at an angle of −45° with respect to the longitudinal axis 254. Consequently, the carbon fibres 250, 250' in adjacent layers define a plurality of rhombus-shaped or diamond-shaped electrically conductive carbon fibre loops 280 when the fluid conduit 240 is viewed from the side as shown in FIG. 4(*a*).

Inductive heating of the fluid conduit 240 is accomplished using a plurality of heating coils 282 as shown in FIGS. 4(*b*) and 4(*c*). Each heating coil 282 is positioned in proximity to an outer surface 244 of the fluid conduit 240 and is generally aligned with a corresponding carbon fibre loop 280. The heating coils 282 are housed within an electrically insulating pad 284. The pad 284 may be brought into proximity with and aligned relative to the fluid conduit 240 by a Remotely Operated Vehicle (ROV) (not shown). Alternatively, the pad 284 may be attached to the fluid conduit 240.

In use, an AC electrical current is driven through each heating coil 282 so as to create a plurality of alternating magnetic fields. Each magnetic field induces a corresponding AC electrical current in a corresponding carbon fibre loop 280 of the fluid conduit 240. This results in heating of the composite layers which include the carbon fibres 250, 250'. For enhanced coupling and efficient heating, the orientation and geometry of the heating coils 282 is matched to the orientation and geometry of the carbon fibre loops 280.

Figure 5:
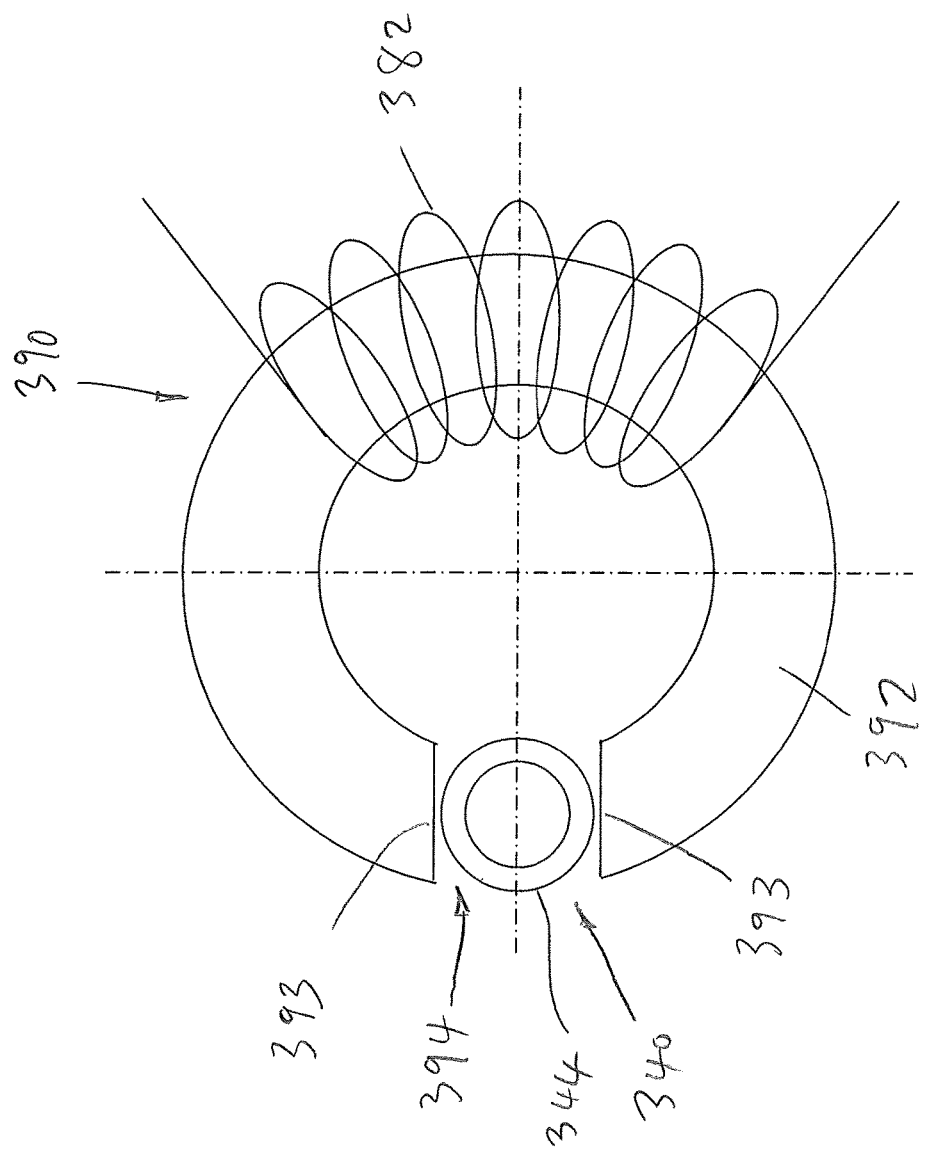
FIG. 5 is a cross-section through a composite tubular for use in the subsea infrastructure of FIG. 1 during inductive heating thereof using an electromagnet having a split core.

FIG. 5 illustrates an alternative arrangement for heating a fluid conduit 340 which may represent the fluid conduit 40 of FIGS. 2(a) and 2(b) or the fluid conduit 140 of FIGS. 3(a) and 3(b). As shown in FIG. 5, a single electromagnet 390 is used to heat the fluid conduit 340. The electromagnet 390 comprises a split ferromagnetic core 392 and an insulated electrical conductor 382 wrapped around the core 392. The core 392 is generally annular. The core 392 is split so as define two ends 393 which are disposed opposite one another so as to define a gap 394 therebetween. The gap 394 is configured to receive a portion of the fluid conduit 340. The ends 393 of the core 392 may be brought into close proximity with, or may engage, the outer surface of 344 of the fluid conduit 340. In use, AC is passed through the electrical conductor 382 of the electromagnet 390 so as to generate an alternating magnetic field which extends into the fluid conduit 340 for the inductive heating thereof. In such an arrangement, the fluid conduit 340 effectively serves as an extension of the core 392 of the electromagnet 390 so as to enhance of the efficiency of coupling of the magnetic field from the electromagnet 390 to the fluid conduit 340. This may, in turn, enhance the efficiency of inductive heating of the fluid conduit 340.

FIG. 6(a) illustrates the use of the heating method described with reference to FIGS. 4(a)-4(c) for deforming a portion of a composite fluid conduit 440 for compliance with a connector component 496. The fluid conduit 440 may represent the fluid conduit 40 of FIGS. 2(a) and 2(b) or the fluid conduit 140 of FIGS. 3(a) and 3(b). The composite fluid conduit 440 comprises a conical flange portion 497. The conical flange portion 497 of the fluid conduit 440 is configured to be received by a tapered bore 499 of the connector component 496. The connector component 496 is configured for connection using fasteners such as bolts (not shown) to a further component 498 so as to secure the further component 498 to an end of the fluid conduit 440. The connector component 496 may be formed from the same composite material as the composite fluid conduit 440. Alternatively, the connector component 496 may be formed from a metal such as steel.

The concentration, distribution and/or orientation of the carbon fibres in the region of the conical flange portion 497 are controlled to provide a predetermined electrical conductivity.

The conical flange portion 497 is inductively heated using heating coils 482 housed within electrically insulating pads 484 in the same manner already described with reference to FIG. 4(a)-4(c) until the conical flange portion 497 of the fluid conduit 440 becomes soft or compliant. The conical flange portion 497 and the tapered bore 499 are forced together prior to, during and/or after inductive heating of the conical flange portion 497 causing an outer surface of the conical flange portion 497 and/or an inner surface of the tapered bore 499 to deform and comply with one another. Deforming the outer surface of the conical flange portion 497 and/or the inner surface of the tapered bore 499 in this way may improve the compliance of the outer surface of the conical flange portion 497 and/or the inner surface of the tapered bore 499. This may provide a more uniform distribution of a subsequent load transferred between the conical flange portion 497 and the inner surface of the tapered bore 499.

FIG. 6(b) illustrates the use of the heating method described with reference to FIGS. 4(a)-4(c) for joining two composite fluid conduits 540a and 540b end-to-end. The fluid conduits 540a and 540b have complementary chamfered or scarved ends 599a and 599b respectively. Each fluid conduit 540a, 540b includes a plurality of composite layers (not shown in FIG. 6(b)), each composite layer having one or more reinforcing elements in the form of one or more carbon fibres (not shown) embedded within a PEEK matrix material (not shown). Each fluid conduit 540a, 540b may represent the fluid conduit 40 of FIGS. 2(a) and 2(b) or the fluid conduit 140 of FIGS. 3(a) and 3(b). The concentration, distribution and/or orientation of the carbon fibres in the regions of the ends 599a, 599b of the fluid conduits 540a, 540b are controlled to provide a predetermined electrical conductivity.

The ends 599a, 599b of the fluid conduits 540a, 540b are inductively heated using heating coils 582 housed within electrically insulating pads 584 in the same manner already described with reference to FIG. 4(a)-4(c) until the composite material of the fluid conduits 540a, 540b melts. The ends 599a, 599b of the fluid conduits 540a, 540b are brought into engagement and/or forced together prior to, during and/or after melting of the ends 599a, 599b of the fluid conduits 540a and 540b until the ends 599a, 599b of the fluid conduits 340a, 340b are fused or bonded together.

Additionally or alternatively, the ends 599a, 599b of the fluid conduits 540a, 540b may be resistively heated. Electrical conductors may extend through any outer electrically insulating layer of the fluid conduits 540a, 540b to permit a DC or an AC electrical current to be driven through the regions of the fluid conduits 540a, 540b adjacent to the ends 599a, 599b for this purpose.

Figure 7:
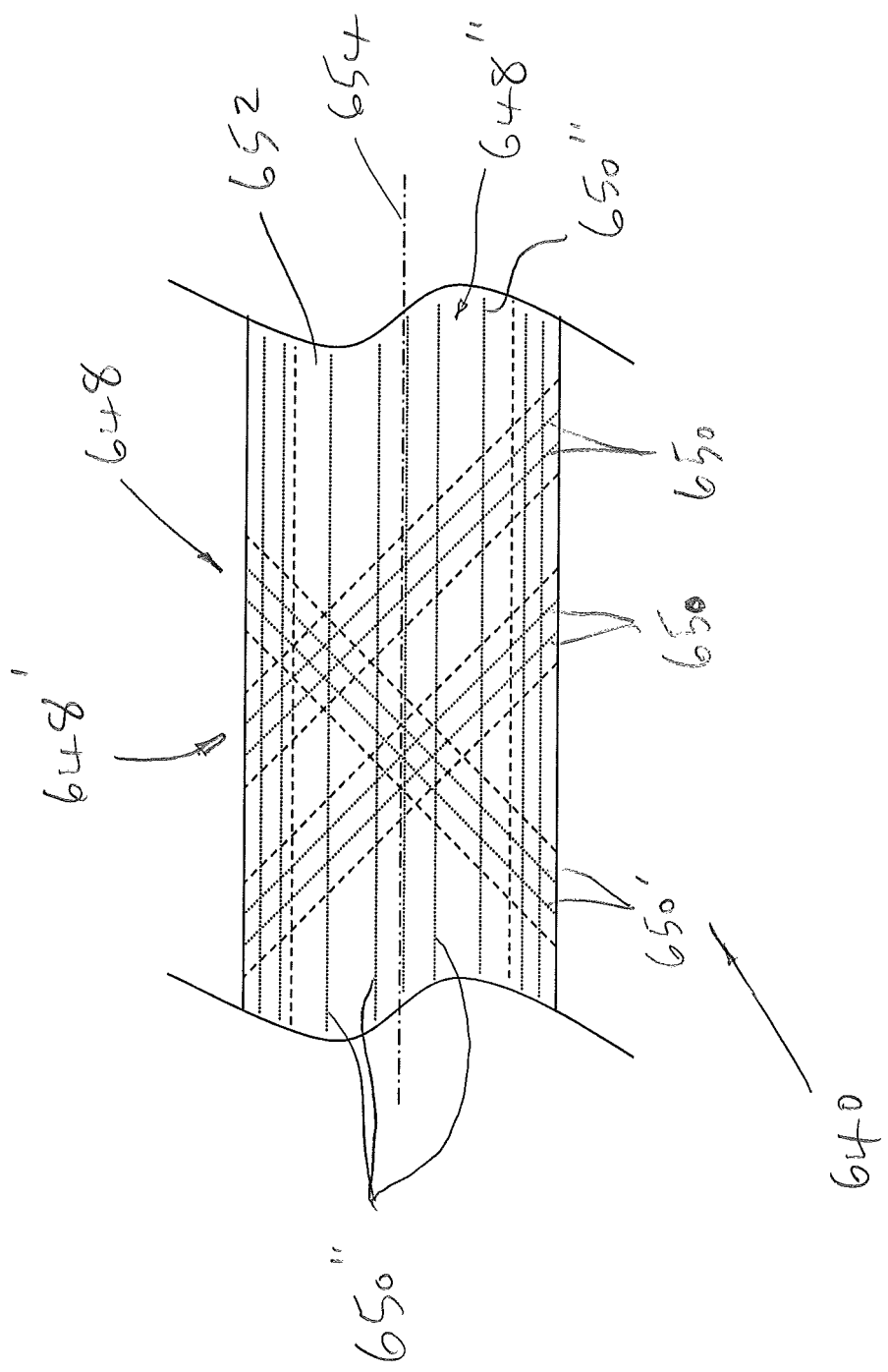
FIG. 7 is a side elevation of a further alternative composite tubular for use in the subsea infrastructure of FIG. 1.

FIG. 7 illustrates an alternative fluid conduit 640 for use in one of the risers 18 or one of the jumpers 30 of the subsea infrastructure 10 of FIG. 1. The fluid conduit 640 shares many features with the fluid conduit 40 of FIGS. 2(a) and 2(b) and, as such, like features in FIG. 7 share like reference numerals with the corresponding features in FIGS. 2(a) and 2(b) incremented by "600". The fluid conduit 640 of FIG. 7 includes a plurality of first composite layers 648 alternating with a plurality of second composite layers 648'. Each first composite layer 648 has a plurality of reinforcing elements in the form of a plurality of first carbon fibres 650 embedded within a PEEK matrix material 652 and aligned at +45° with respect to a longitudinal axis 654 of the fluid conduit 640. Each second composite layer 648' has a plurality of reinforcing elements in the form of a plurality of second carbon fibres 650' embedded within a PEEK matrix material 652 and aligned at −45° with respect to the longitudinal axis 654. The plurality of first carbon fibres 650' and the plurality of second carbon fibres 650' provide the fluid conduit 640 with structural strength.

The fluid conduit 640 of FIG. 7 includes a further composite layer 648" located radially outwardly of the of the plurality of first composite layers 648 and the plurality of second composite layers 648'. The further composite layer 648" has a plurality of unidirectional reinforcing elements in the form of a plurality of unidirectional carbon fibres 650" embedded within a PEEK matrix material 652. The unidirectional carbon fibres 650" are aligned generally parallel to the longitudinal axis 654. The unidirectional carbon fibres 650" are electrically insulated from the plurality of first carbon fibres 650 and the plurality of second carbon fibres 650'. The fluid conduit 640 further comprises at least two electrical conductors (not shown) for providing an electrical connection to the unidirectional carbon fibres 650". Providing the unidirectional carbon fibres 650" separately from the plurality of first carbon fibres 650 and the plurality of second carbon fibres 650' as described above, may allow the structural properties of the fluid conduit 640 and the electrical properties of the fluid conduit 640 to be controlled independently.

In use, the an electrical current, AC and/or DC, is driven through the at least two electrical conductors (not shown) and the unidirectional carbon fibres 650" for resistive heating of the unidirectional carbon fibres 650". The heat generated in this way may be conducted through the wall of the fluid conduit 640 to an fluid present in the fluid flow path 643.

Figure 8:
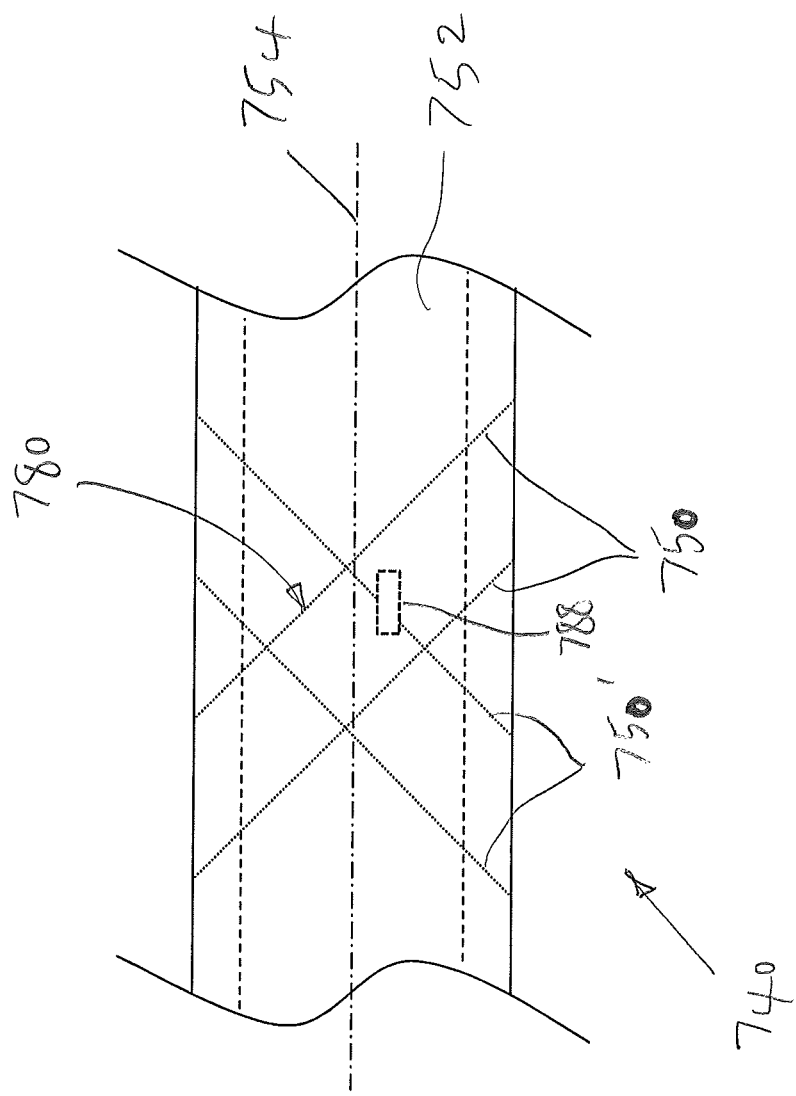
FIG. 8 is a side elevation of a yet further alternative composite tubular for use in the subsea infrastructure of FIG. 1.

FIG. 8 illustrates a further alternative fluid conduit 740 for use in one of the risers 18 or one of the jumpers 30 of the subsea infrastructure 10 of FIG. 1. The fluid conduit 740 shares many features with the fluid conduit 40 of FIGS. 2(*a*) and 2(*b*) and, as such, like features in FIG. 8 share like reference numerals with the corresponding features in FIGS. 2(*a*) and 2(*b*) incremented by "700". The fluid conduit 740 of FIG. 8 includes two reinforcing elements in the form of two first carbon fibres 750 embedded within a PEEK matrix material 752 and aligned at +45° with respect to a longitudinal axis 754 of the fluid conduit 740. The fluid conduit 740 further includes two reinforcing elements in the form of two second carbon fibres 750' embedded within the PEEK matrix material 752 and aligned at −45° with respect to the longitudinal axis 754. The carbon fibres 750 and 750' define an electrically conductive loop 780. The fluid conduit 740 further comprises an electrical component 788 which is connected electrically into the electrically conductive loop 780. In use, an electrical current may be induced in the electrically conductive loop 780, for example using one of the techniques described with reference to FIGS. 4(*a*)-4(*c*) or FIG. 5 so as to provide electrical current to the electrical component 788. The electrical current may, for example, be used to provide electrical power to the electrical component 788.

One skilled in the art will appreciate that various modifications of the foregoing embodiments are possible without departing from the scope of the present invention as defined by the following claims. For example, with reference to FIGS. 2(*a*) and 2(*b*), electrical conductors (not shown) may be inserted through the outer PEEK layer 49 so as to make electrical contact with the composite layers 48, 48'. The electrical conductors (not shown) may be connected to an electrical source (not shown). The electrical source (not shown) may be used to drive an electrical current along the electrical conductors (not shown) and through the composite layers 48, 48' of the portion of the fluid conduit 40 extending between the electrical conductors (not shown). The driven electrical current resistively heats the composite layers 48, 48'. The heat generated by the driven electrical current is additional to the heat generated in the composite layers 48, 48' by the flow of the electrical current induced according to any of the methods described with reference to FIGS. 4(*a*) to 6(*b*). If an AC electrical source is used, it is thought that not only does resistive heating occur between adjacent composite layers 48, 48', but that AC magnetic fields are created by the driven AC which induce AC current flow in non-adjacent composite layers 48, 48'. Consequently, driving AC through the plurality of composite layers 48, 48' may result in a more even distribution of heat in the composite layers 48, 48' compared with driving DC through the plurality of composite layers 48, 48'. However, depending on the configuration of the carbon fibres 50, 50' in the PEEK matrix 52, the capacitance associated with the composite layers 48, 48' may be so high as to prohibit the use of AC for fluid conduit lengths of greater than 1 km. For such fluid conduits having a length of 1 km or greater, the use of DC may be preferred.

Similarly, although not shown in FIG. 3(*a*) or FIG. 3(*b*), electrical conductors may be inserted through the outer glass layer 178, the outer plurality 176 of composite layers 148, 148' and the glass isolation layer 170 so as to make electrical contact with the inner plurality 174 of composite layers 148, 148'. The electrical conductors (not shown) may be connected to an electrical source (not shown). The electrical source (not shown) may be used to drive an electrical current along the electrical conductors (not shown) and through the composite layers 148, 148' of the portion of the fluid conduit 140 extending between the electrical conductors (not shown). The driven electrical current resistively heats the composite layers 148, 148'. The heat generated by the driven electrical current is additional to the heat generated in the composite layers 148, 148' by the flow of the electrical current induced according to any of the methods described with reference to FIGS. 4(*a*) to 6(*b*).

The configuration of the carbon fibres in the composite layers may be different to those described. The concentration, distribution and/or orientation of carbon fibres may be different in different regions of a fluid conduit to control the electrical conductivity and, therefore, the degree of heating. The carbon fibres in adjacent composite layers may have different directions to those described. The carbon fibres in adjacent composite layers may have the same direction. This may reduce the number of fibre crossings and thereby reduce the electrical conductivity in the vicinity of the adjacent composite layers. The concentration of carbon fibres may be increased around a bend of a fluid conduit to increase the degree of heating in the region of the bend. The concentration of carbon fibres may be increased in the end regions of fluid conduits to increase the degree of heating in the end regions to permit fusing or bonding of the fluid conduits end-to-end.

Rather than using carbon fibre reinforcing elements, any electrically conductive reinforcing elements may be used. Electrically conductive fibres, particles, nanotubes or the like may be used in addition to, or as an alternative to carbon fibre reinforcing elements. Matrix materials other than PEEK may be used. A thermosetting or thermoplastic polymer may be used. PEK or PVC may be used. Electrically insulating materials other than glass fibre may be used for electrical isolation.

The number and arrangement of heating coils used for inductive heating may be different to those shown in FIGS. 4(*a*) to 6(*b*). For example, rather than using a plurality of heating coils aligned axially side-by-side in the proximity of an outer surface of a fluid conduit as shown in FIG. 4(*b*), the heating coils may be aligned circumferentially side-by-side in the proximity of an outer surface of a fluid conduit so that the plurality of heating coils extend around part or the whole of the outer surface of the fluid conduit. Additionally or alternatively each heating coil may extend at least part-way circumferentially around the fluid conduit in the proximity of an outer surface of the fluid conduit.

Figure 6:
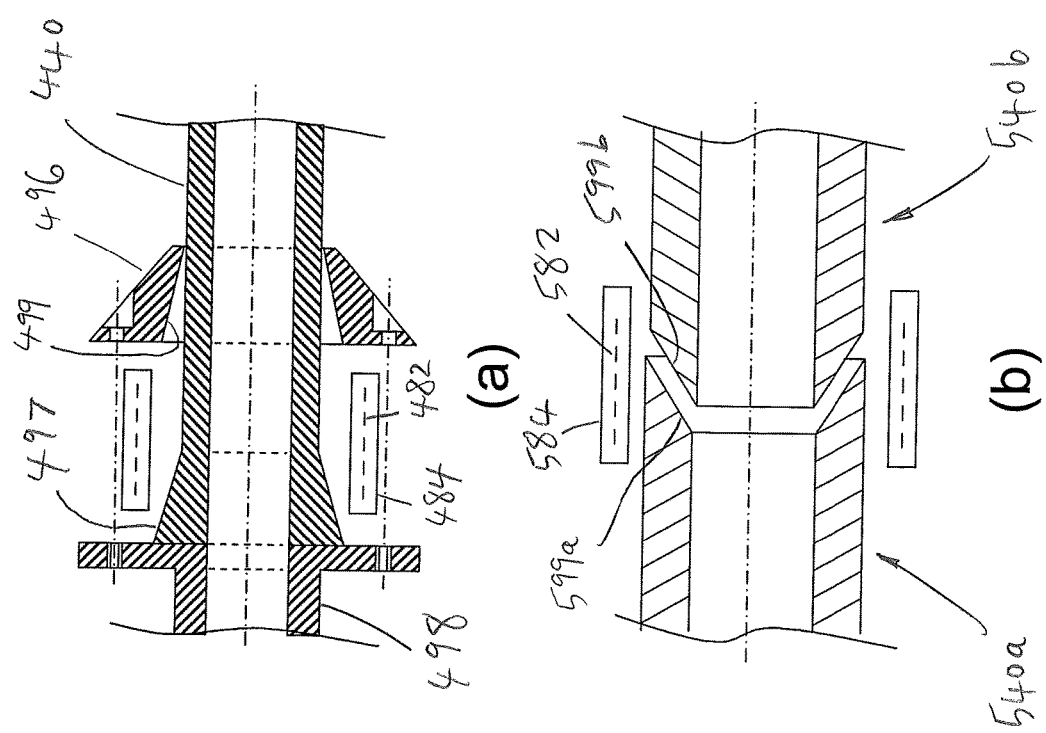
FIG. 6(*a*) is a longitudinal cross-section through a composite tubular and a connector component during heating of the composite tubular.

Rather than using one of the heating methods described with reference to FIG. 6(*b*) to join the two composite fluid conduits 540a, 540b together, one of the heating methods may be used to join a composite fluid conduit to a component formed from a different type of material, for example, a metal such as steel.

The method may comprise heating a portion of a composite fluid conduit so as to melt the matrix material allowing the matrix material to flow into a recess or a channel defined in a further component such as a further metal component. The method may comprise allowing the molten matrix material to solidify in the recess or channel so as to define a feature which is complementary to, and interlocks, with the recess or channel. Additional matrix material may also be provided, electrically heated and melted to define the complementary interlocking feature if required.

The invention claimed is:

1. A method for manufacturing a tubular, the tubular comprising a composite material including a matrix and a plurality of reinforcing elements embedded within the matrix, and the method comprising:
   configuring the reinforcing elements and/or the matrix so as to control the direct induction of a flow of electrical current in the composite material on exposure of the composite material to a time-varying magnetic field,
   the matrix consisting of a polyether ether ketone (PEEK) matrix material,
   the reinforcing elements comprise carbon fiber reinforcing elements,
   and the volume fraction of reinforcing elements within the matrix is greater than 55%.

2. The method according to claim 1, comprising:
   providing the tubular with a first composite layer having a plurality of first reinforcing elements; and
   providing the tubular with a second composite layer located adjacent to the first composite layer, the second composite layer having a plurality of second reinforcing elements.

3. The method according to claim 2, comprising controlling a separation between a first reinforcing element in the first composite layer and a second reinforcing element in the second composite layer so as to control a flow of electrical current between the first and second reinforcing elements.

4. The method according to claim 2, comprising controlling the relative alignment of the first and second reinforcing elements so as to control a flow of electrical current between the first and second reinforcing elements.

5. The method according to claim 2, comprising:
   aligning the first reinforcing elements along a first direction; and
   aligning the second reinforcing elements along a second direction.

6. The method according to claim 2, comprising controlling a pitch between adjacent first reinforcing elements within the first composite layer and/or controlling a pitch between adjacent second reinforcing elements within the second composite layer.

7. A heated system, comprising:
   a tubular which includes a composite material having a matrix consisting of a polyether ether ketone (PEEK) matrix material and a plurality of reinforcing elements comprise carbon fibre reinforcing elements, embedded within the matrix and the volume fraction of reinforcing elements within the matrix is greater than 55%; and
   an apparatus for generating a time-varying magnetic field, wherein the tubular and the apparatus are configured for coupling of the magnetic field therebetween to directly induce a flow of electrical current in the composite material.

8. A tubular comprising a composite material including a matrix and a plurality of reinforcing elements embedded within the matrix, wherein the composite material is configured so as to control the direct induction of a flow of electrical current in the composite material on exposure of the composite material to a time-varying magnetic field,
   the matrix consists of a polyether ether ketone (PEEK) matrix material,
   the reinforcing elements comprise carbon fibre reinforcing elements,
   and wherein the volume fraction of reinforcing elements within the matrix is greater than 55%.

9. The tubular according to claim 8, comprising:
   a first composite layer having a plurality of first reinforcing elements; and
   a second composite layer located adjacent to the first composite layer, the second composite layer having a plurality of second reinforcing elements.

10. The tubular according to claim 9, wherein:
    the first reinforcing elements are aligned along a first direction; and
    the second reinforcing elements are aligned along a second direction different from the first direction.

11. The tubular according to claim 8, wherein the composite material is formed on an electrically insulating inner sleeve.

* * * * *